United States Patent [19]

Belik

[11] Patent Number: 5,622,391
[45] Date of Patent: Apr. 22, 1997

[54] HOSE/CLAMP ASSEMBLY

[75] Inventor: Donald R. Belik, Lincoln, Nebr.

[73] Assignee: The Goodyear Tire & Rubber Company, Akron, Ohio

[21] Appl. No.: 586,034

[22] Filed: Jan. 16, 1996

[51] Int. Cl.$^6$ ..................................................... F16L 55/00
[52] U.S. Cl. ........................ 285/23; 285/253; 285/420; 29/464; 29/890.14
[58] Field of Search .......................... 285/23, 252, 253, 285/254, 420, 322, 323, 7; 29/464, 890.14; 24/19, 20 R, 274 R

[56] References Cited

U.S. PATENT DOCUMENTS

| | | | |
|---|---|---|---|
| 3,365,218 | 1/1968 | Denyes | 285/253 |
| 3,407,449 | 10/1968 | Tetzlaff et al. | 285/253 X |
| 3,954,290 | 5/1976 | Corbin | 285/322 |
| 4,758,023 | 7/1988 | Vermillion | 285/7 |
| 4,882,814 | 11/1989 | Takahashi | 24/20 R |
| 5,002,094 | 3/1991 | Brovont | 285/252 X |
| 5,178,421 | 1/1993 | Tressler | 285/23 |
| 5,185,913 | 2/1993 | Compo et al. | 285/253 X |
| 5,234,233 | 8/1993 | Fix | 285/23 |
| 5,456,784 | 10/1995 | Cogdill | 285/253 X |

FOREIGN PATENT DOCUMENTS 2004875  12/1993  Russian Federation ............... 285/252

*Primary Examiner*—Dave W. Arola
*Attorney, Agent, or Firm*—Marc R. Dion, Sr.

[57] ABSTRACT

A hose/clamp assembly is provided wherein the hose is provided with a protrusion which engages with a slot in the clamp. Further provisions allow for the orientation of the clamp on the hose to facilitate assembly onto motor vehicles.

3 Claims, 4 Drawing Sheets

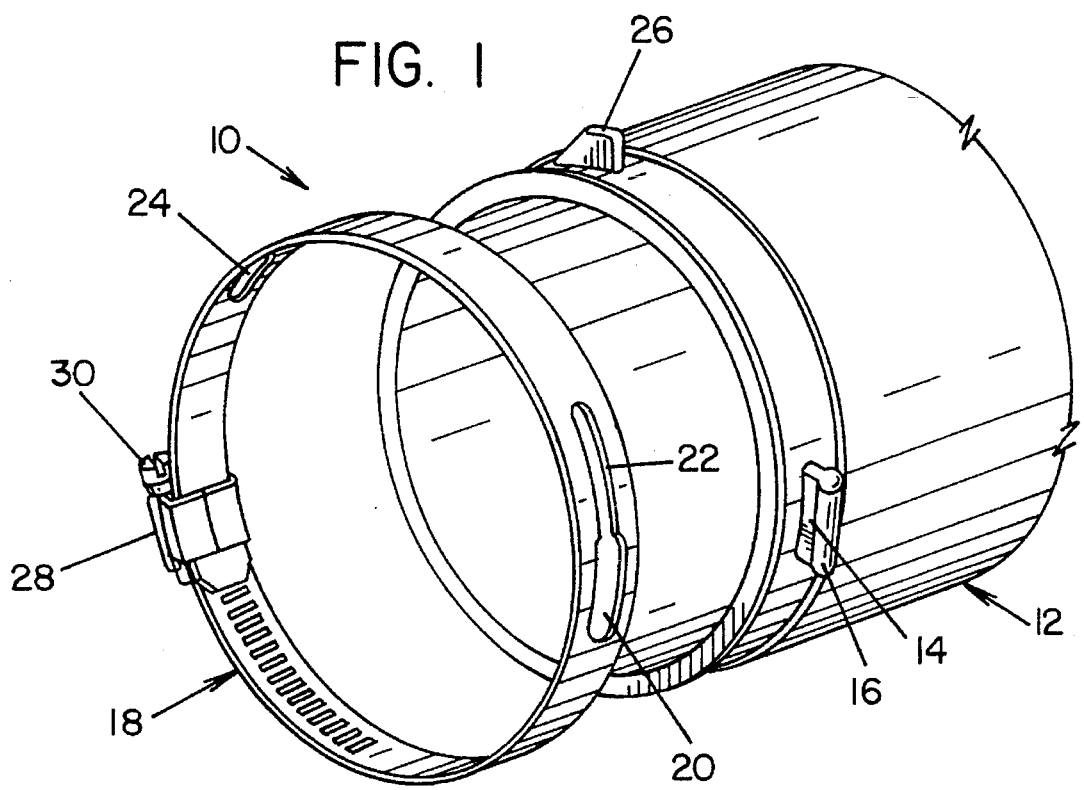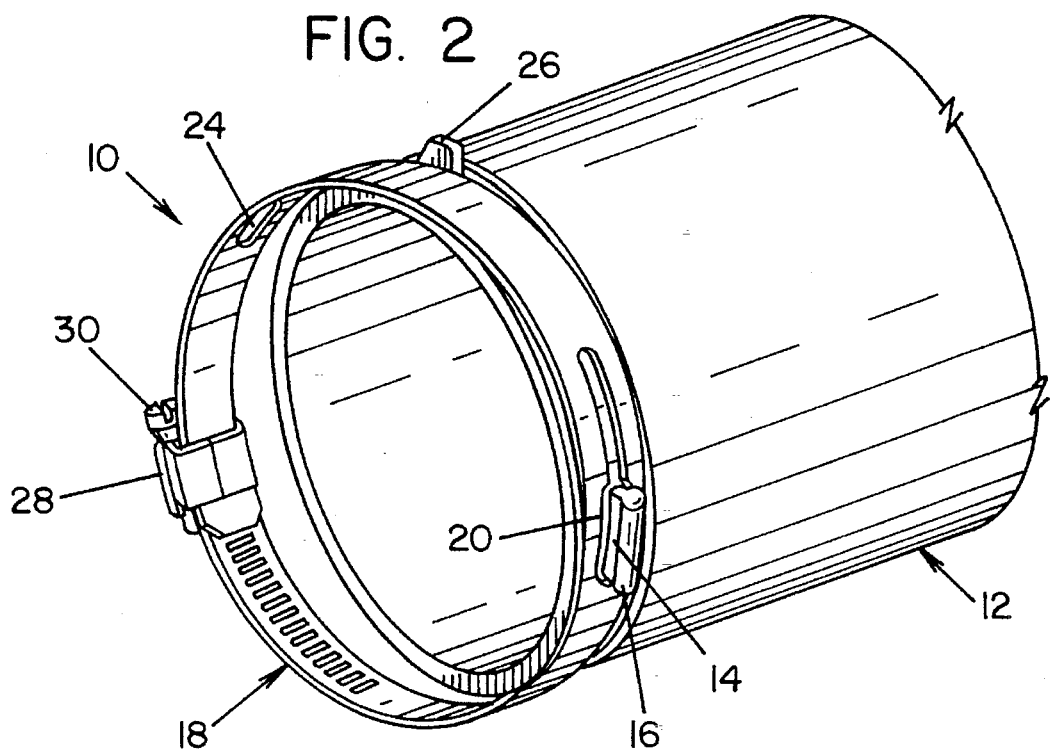

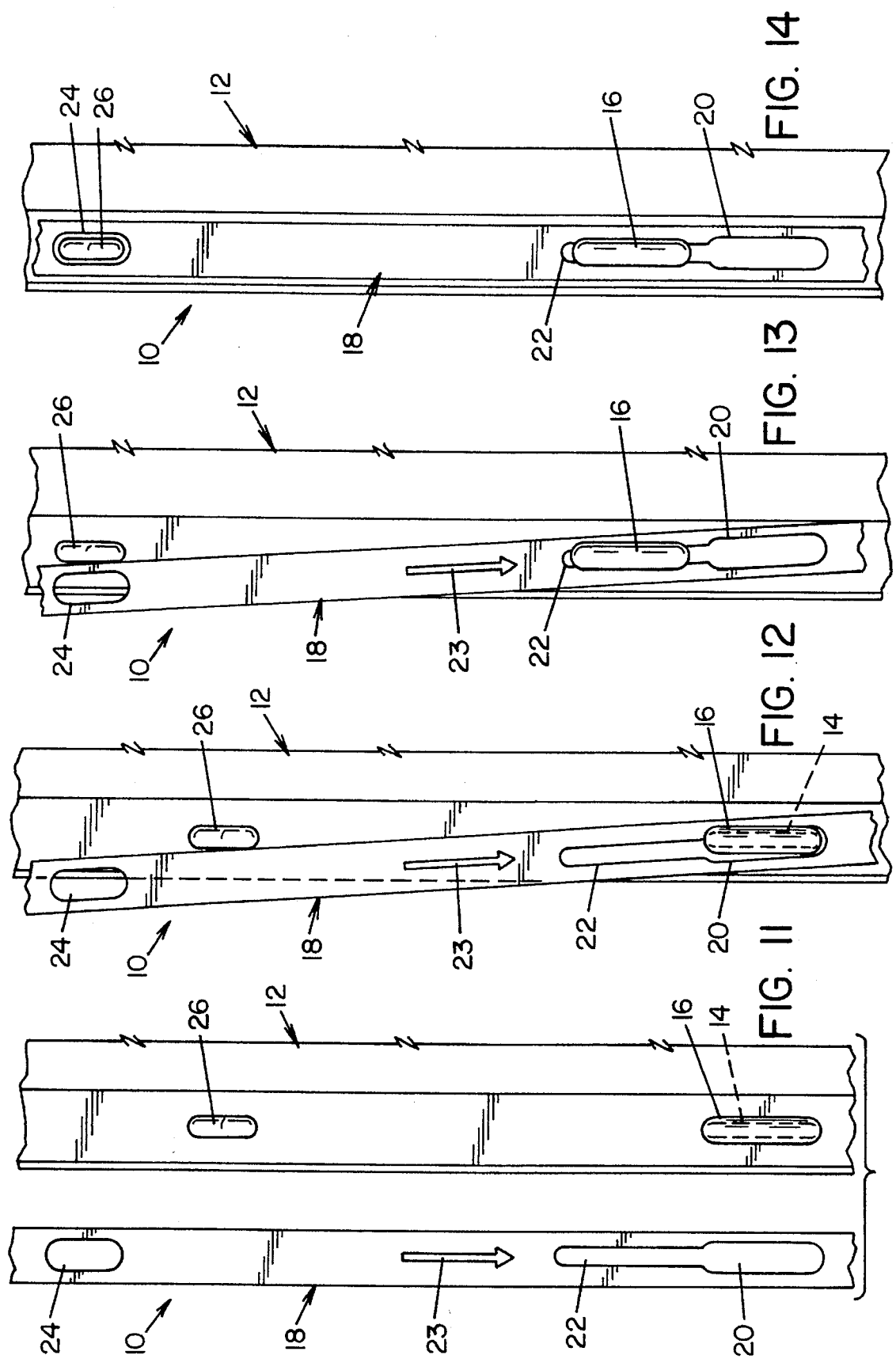

HOSE/CLAMP ASSEMBLY

FIELD OF THE INVENTION

This invention relates to hose/claim assemblies. More particularly, it deals with a hose having a protrusion on it to mate with a slot in the clamp in order to locate and orient the clamp about the hose.

BACKGROUND OF THE INVENTION

Various attempts have been made in the past to pre-assemble hose clamps on hoses. See, for example, U.S. Pat. No. 3,365,218 which describes and illustrates the use of a staple which penetrates into the hose. U.S. Pat. No. 4,882,814 shows the use of metallic retaining plates or arms. U.S. Pat. No. 5,002,094 employs a less than circumferential band of rubber which must be molded and vulcanized over a portion of the clamp. It is felt that this latter arrangement restricts the circumferential expansion of the hose and, thus, its assemblability over nipples in the end use application such as radiator and heater hoses in motor vehicle manufacturing U.S. Pat. No. 5,234,233 utilizes a rubber band having an aperture therein to hold the hose clamp about the hose.

There is, therefore, a need for a hose/clamp assembly which does not invade the integrity of the hose, provides a positive retention of the clamp on the hose at a predetermined location and orientation and does not require additional operations such as molding and vulcanization.

According to the practice of the present invention, there is provided a hose/clamp assembly comprising a hose having a protrusion thereon, the protrusion has a stem portion proximate the hose and a head portion distal therefrom; and a hose clamp having a first slot of sufficient size to receive the head portion of the protrusion and a second slot as a continuation of the first slot which is narrower than the head portion of the protrusion to receive the stem portion of the protrusion.

There is also disclosed a method of attaching a hose clamp to a hose comprising: (a) providing a hose with a protrusion having a stem portion proximate one end of the hose and a head portion distal from the hose; (b) providing a clamp with a first slot of sufficient size to receive the head portion of the protrusion and a second slot as a continuation of the first slot to receive the stem portion; (c) placing the first slot over the head portion of the protrusion; and (d) rotating the clamp relative to the hose to engage the stem portion of the protrusion in the second slot.

BRIEF DESCRIPTION OF THE DRAWINGS

FIG. 1 is a perspective, exploded view of the hose clamp and the hose which make up the present invention.

FIG. 2 is a perspective view of the hose/clamp combination during partial assembly.

FIGS. 11–14 are partial plan views illustrating various stages of the assembly of the combination.

DETAILED DESCRIPTION OF THE INVENTION

Figure 3:
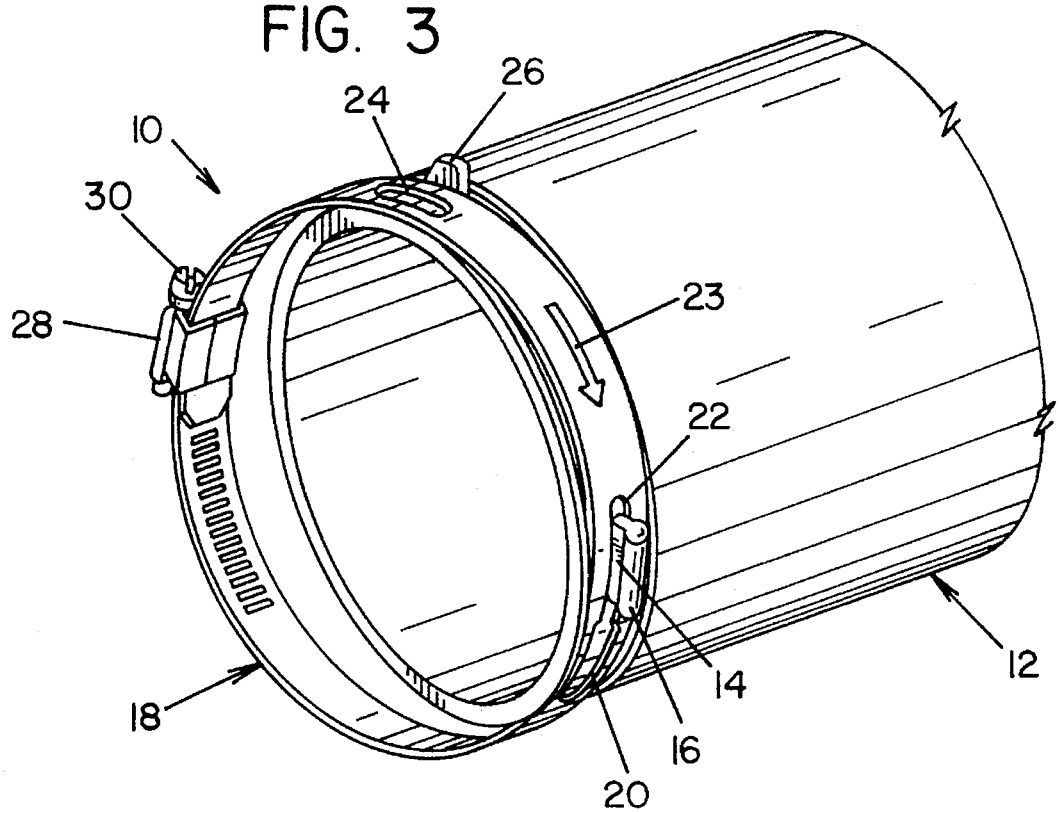
FIG. 3 is the combination of FIG. 2 after further assembly.
Figure 4:
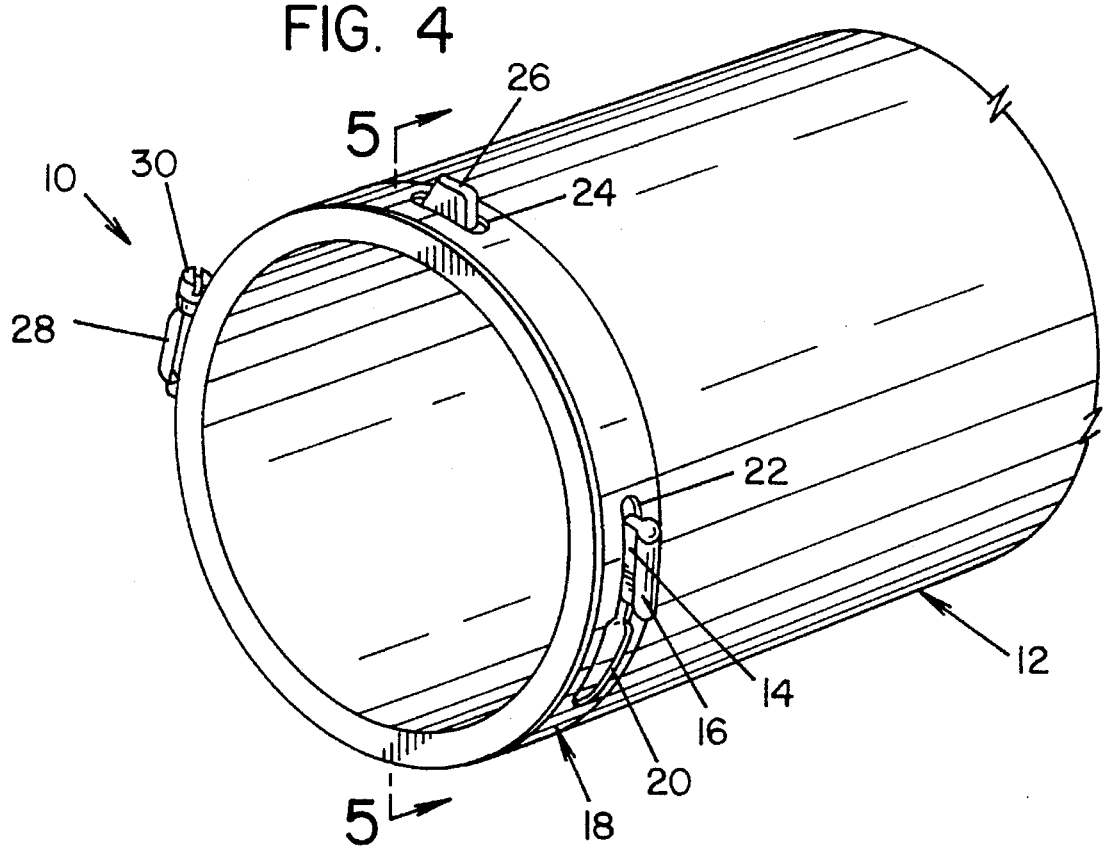
FIG. 4 is a perspective view of the complete combination.
Figure 5:
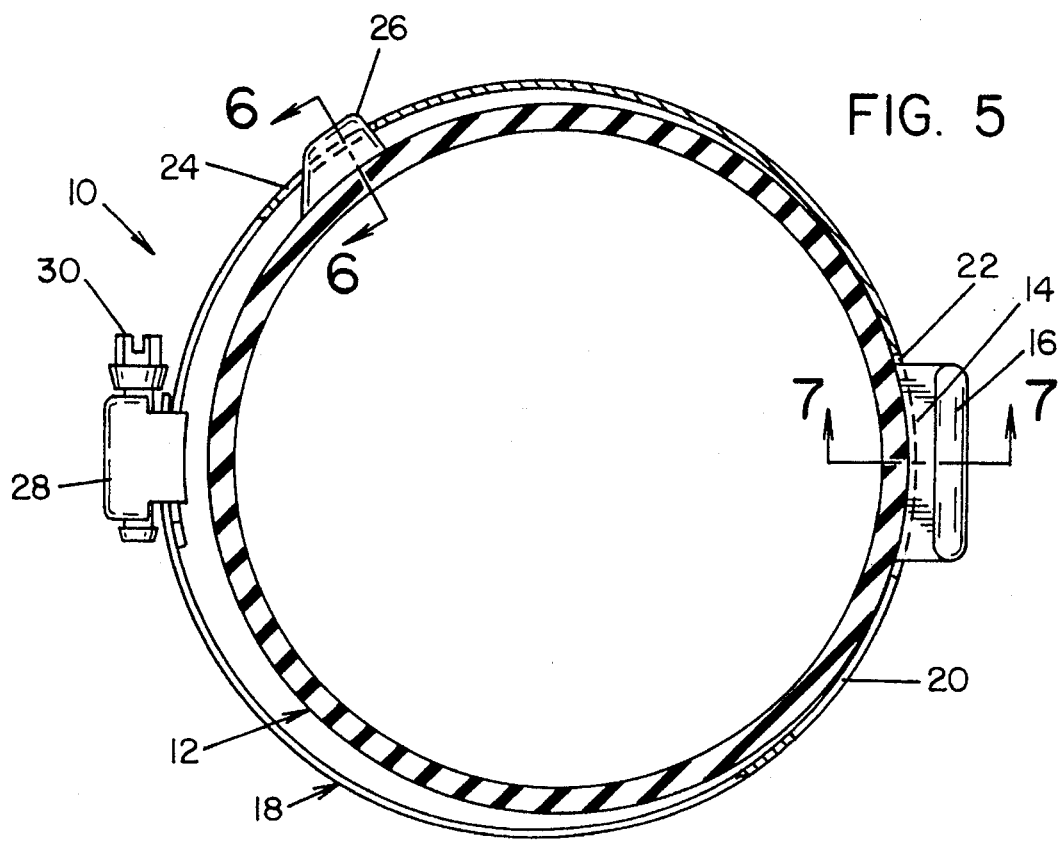
FIG. 5 is a sectional view taken along line 5—5 of FIG. 4.
Figure 6:
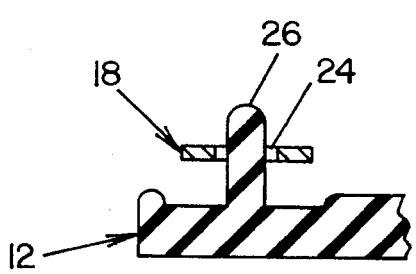
FIG. 6 is a sectional view taken along line 6—6 of FIG. 5.

The hose/clamp assembly shown generally at 10 is comprised of a hose 12 having a protrusion thereon comprised of a stem portion 14 proximate one end of the hose and a head portion 16 distal from the hose. The clamp 18 has a first slot 20 of sufficient size to receive the head portion 16 of the protrusion. The second slot 22 is provided as a continuation of the first slot 20 and is of such size as to receive the stem portion 14 of the protrusion that is smaller than the head portion 16 of the protrusion. The hose 12 also has an orientation stub 26 which aligns with the orientation hole 24 of the clamp in order to fix the location of the screw 30 of the clamp housing 28 of the clamp 18 in order to facilitate assembly at an automotive manufacturing plant.

Figure 8:
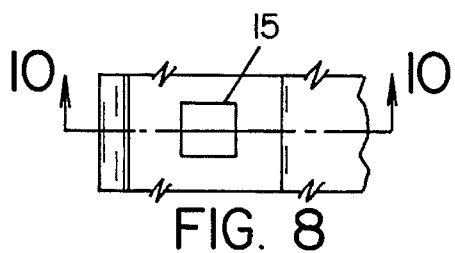
FIG. 8 is a plan view of an alternate embodiment of the protrusion of the present invention.
Figure 7:
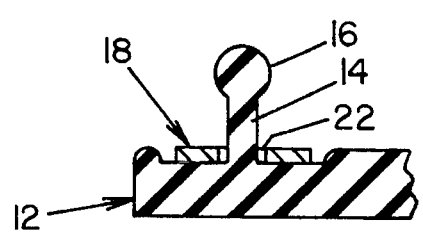
FIG. 7 is a sectional view taken along line 7—7 of FIG. 5.
Figure 9:
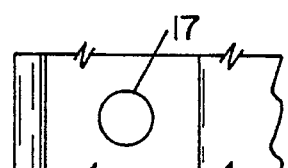
FIG. 9 is a plan view of another alternate embodiment.
Figure 10:
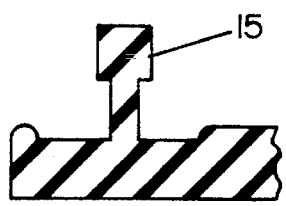
FIG. 10 is a sectional view taken along line 10—10 of FIG. 8.

While one particular shape is illustrated in FIGS. 1–5 and 7, it can be appreciated that other shapes such as are illustrated at 15 and 16 in FIGS. 8–10 can also be utilized.

FIGS. 11–14 illustrate the assembly of the clamp onto the hose whereby the first slot 20 of the hose clamp is placed over the head portion 16 of the protrusion and the clamp 18 is twisted in direction 23 about the hose 12 until the stem portion 14 of the protrusion is oriented within the second slot 22. Next, the orientation hole 24 of the clamp 18 is aligned with the orientation stub 26 of the hose The hose is then squeezed until the orientation stub 26 is within the orientation hole 24.

The hoses of the present invention are preferably made by injection molding.

While certain representative embodiments and details have been shown for the purpose of illustrating the invention, it will be apparent to those skilled in this art that various changes and modifications may be made therein without departing from the spirit or scope of the invention.

What is claimed is:

1. A method of attaching a hose clamp to a hose comprising:

a) providing a hose with a protrusion having a stem portion proximate said hose and a head portion distal therefrom;

b) providing a clamp with a first slot of sufficient size to receive the hose portion of the protrusion and a second slot as a continuation of said first slot to receive the stem portion of the protrusion;

c) placing the first slot over the head portion of the protrusion; and d) rotating the clamp relative to the hose to engage the stem portion of the protrusion in the second slot.

2. A hose/clamp combination comprising a hose having a protrusion thereon, said protrusion having a stem portion proximate said hose and a head portion distal therefrom; and a hose clamp having a first slot of sufficient size to receive said head portion of said protrusion and a second slot as a continuation of the first slot which is narrower than said head portion of the protrusion to receive the stem portion of the protrusion.

3. The hose/clamp combination of claim 2 further comprising an orientation stub on said hose and an orientation hole in said clamp to locate and orient the clamp on said hose.

* * * * *